Oct. 24, 1950 W. R. SAKS 2,527,501
PROCESS OF PRODUCING FLOCKED ARTICLES
Filed March 28, 1949 3 Sheets-Sheet 1
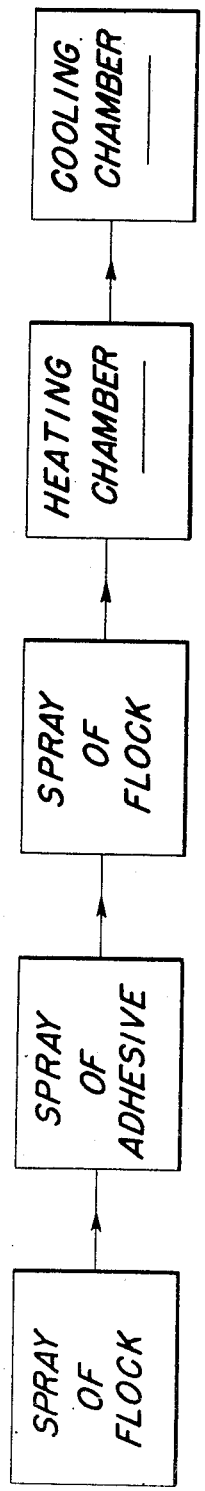
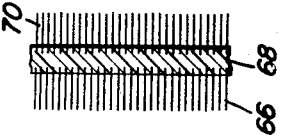
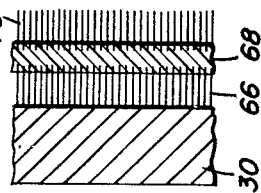
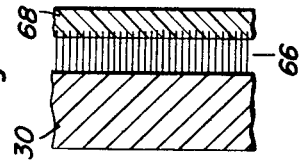
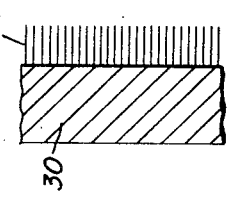
Inventor
Walter R. Saks
By Clarence A. O'Brien
and Harvey B. Jackson
Attorneys

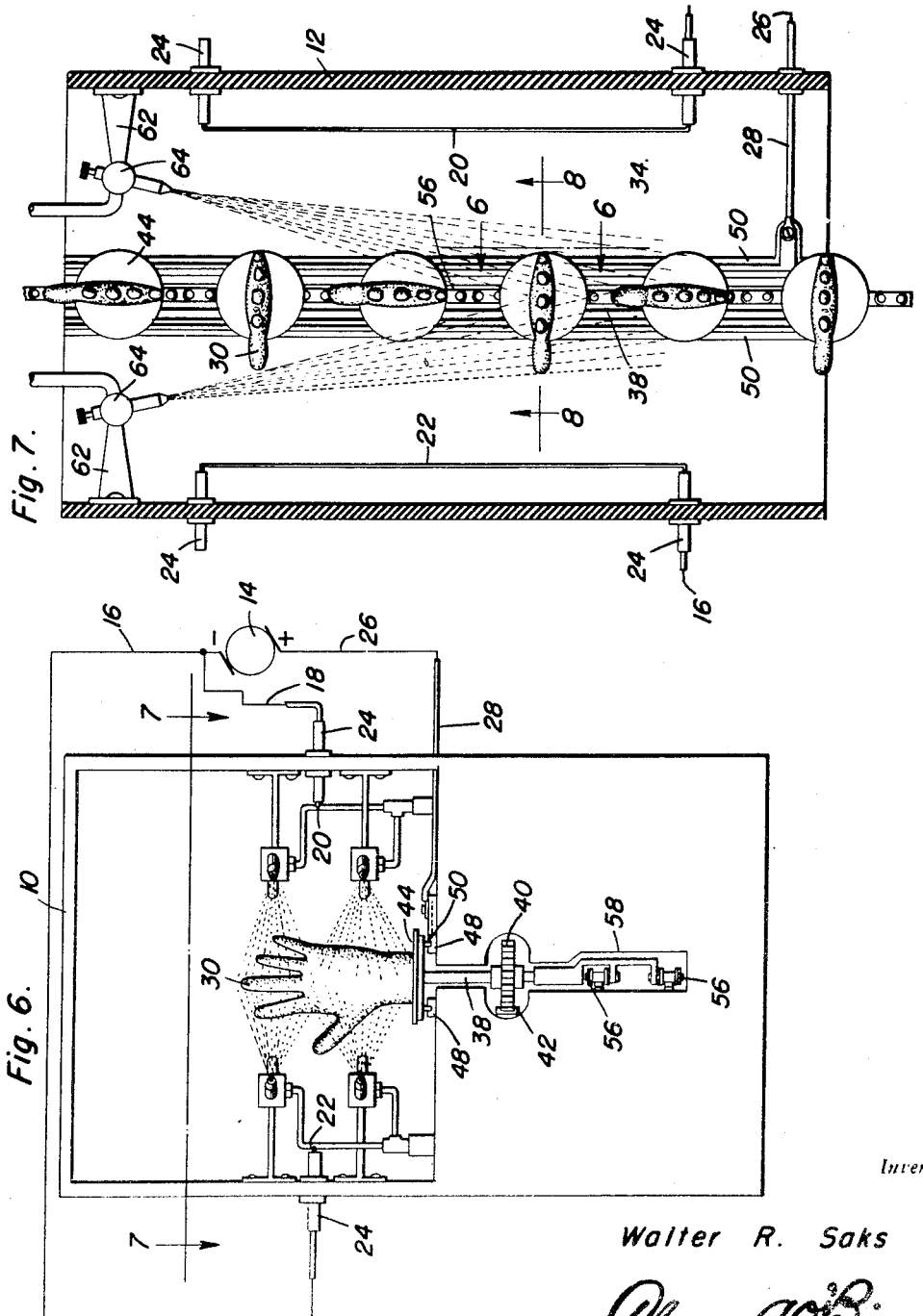

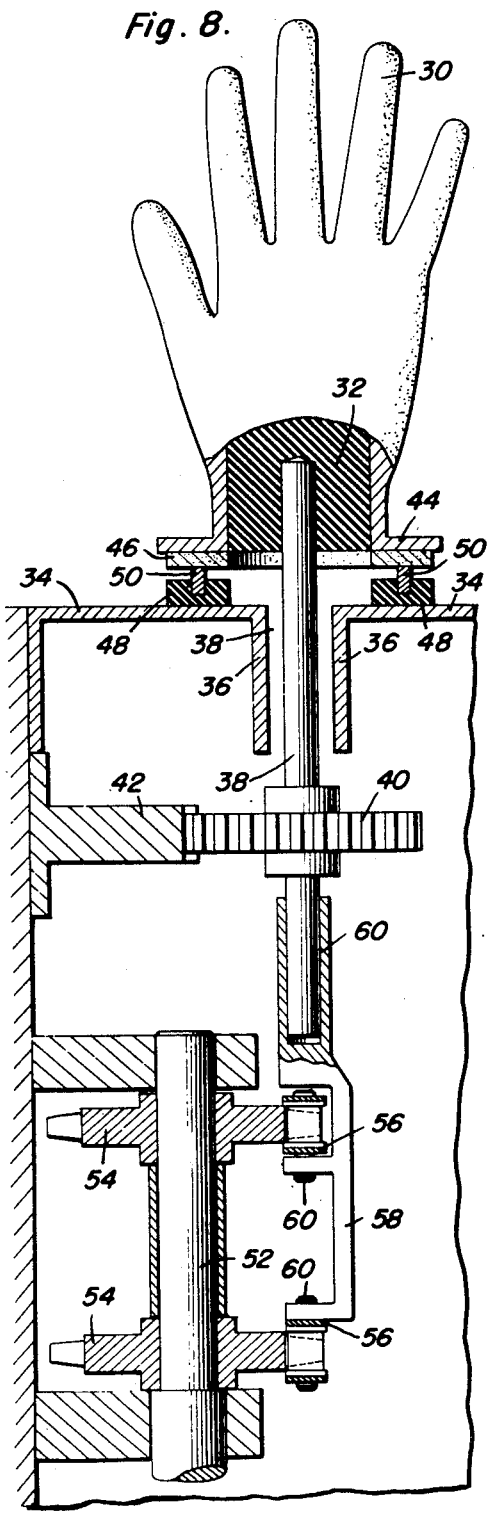
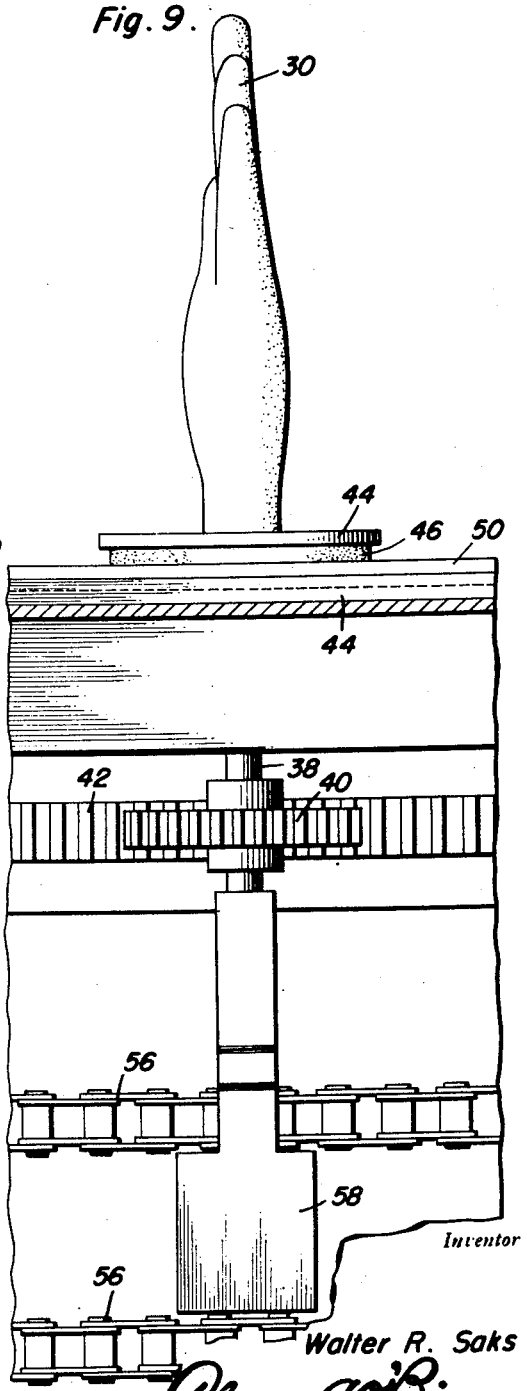

Patented Oct. 24, 1950

2,527,501

UNITED STATES PATENT OFFICE 2,527,501

PROCESS OF PRODUCING FLOCKED ARTICLES

Walter R. Saks, New York, N. Y.

Application March 28, 1949, Serial No. 83,898

9 Claims. (Cl. 154—76)

1

This invention relates to a novel double flocked article and the process of producing the article rapidly and efficiently.

The primary object of this invention is to provide an article having two layers of flock separated solely by a layer of adhesive, the flock fibers being partially embedded in the adhesive layer and extending substantially perpendicularly therefrom. While it is contemplated that such articles be molded in the form of gloves, it will be understood that any shaped or flat article can be produced by the process to be described more fully hereinafter. The double flocked articles presently on the market consist of layers of flock separated by a substantial backing material. The process and article of the instant invention does away completely with this backing material, thus rendering the present articles cheaper, more attractive, generally lighter in weight, and more pliable.

The present article are one-piece finished items without sewn seams in contradistinction to the conventional double flocked articles.

Another important object of this invention is to provide a process for producing double flocked articles of any desired shape and form employing the assembly line technique so that large numbers of these articles may be produced continuously, rapidly and cheaply.

Another object of this invention is to provide a process of producing articles having inner and outer layers of relatively short fibers, the process being exceptionally efficient for producing desired shapes which are odd, uneven, unusual, or non-spherical.

Yet a further object of this invention is to provide a double flocked article and a process for producing the same wherein the fibers may be natural, such as cotton or wool, or artificial, such as viscose or acetate rayon. The novel process of the instant invention employs the basic principle of depositing piled surfaces on a mold passing through a high-voltage electrostatic field as set forth in the patents to H. A. Wintermute, 2,173,032 and 2,221,338, the patent to F. W. Manning, 2,336,745, the patent to H. P. Ransburg et al., 2,247,963, and the patent to W. A. Starkey, 2,425,652. The present invention, however, goes beyond the simpler application of a high-voltage electrostatic field in the deposition of fibers upon a mold as shown on the prior art acknowledged hereinabove. The present process contemplates first the deposition of short fibers on a moving charged metallic mold, followed by the deposition of certain plastics or adhesives upon the free ends of the fibers retained on the molds, and then the further deposition of short fibers on the adhesive so that when the article is stripped from the mold forms, a double-flocked, pliable material of any desired shape is obtained. As will be readily understood,

2 a large number of finished double-flocked articles may be produced continuously on an assembly line basis. To the best of the inventor's knowledge, the highly developed prior art has apparently not conceived the novel articles of the instant invention and the effective process of producing these articles as hereindescribed.

The process contemplates the use of certain materials, conditions, and sequential process steps which will be more fully hereinafter described in conjunction with the accompanying drawings showing a preferred embodiment of the invention, wherein:

Figure 1 is a flow diagram of the entire process;

Figure 2 is a vertical sectional view through a portion of the metallic mold illustrating the step of first depositing fibers on the mold;

Figure 3 is a view similar to Figure 2 illustrating the step of depositing a layer of adhesive on the free ends of the flock of fibers retained on the mold;

Figure 4 is a view similar to Figure 3 illustrating the step of depositing further flock or fibers on the adhesive layer;

Figure 5 is a fragmentary end elevational view of the finished article;

Figure 6 is a front elevational view looking into the first electrostatic chamber;

Figure 7 is a sectional view taken substantially in the plane of section line 7—7 of Figure 6;

Figure 8 is a sectional view taken substantially in the plane of section line 8—8 of Figure 7;

Figure 9 is an end elevational view of the mold form and conveyor shown in Figure 8.

Specific reference will now be made to the drawings. In the several views in the accompanying drawings and in the following specification reference characters indicate corresponding elements throughout.

The apparatus which may be employed for carrying out the process will now be described particularly with reference to Figures 6 to 9. This apparatus consists essentially of a chamber 10, preferably substantially rectangular, which is open at its front and back. This chamber may be metallic with an inner layer of insulating material or may be fabricated wholly of insulating materials 12, such as wood, plastic, porcelain, etc. A high-voltage source or generator 14 is provided having conductive wires 16 and 18 which lead from one terminal of the source to longitudinally extending discharge electrodes 20 and 22, respectively. The conductive wires 16 and 18 are received in suitable insulating collars 24, such as porcelain, which extend through and are secured to the sides of the chamber, the discharge electrodes 20 and 22 being positioned within the chamber preferably adjacent the sides thereof. The other terminal of the high-voltage source is connected by means of a conductive wire 26 extending through an insulating shield 28, such as porcelain, into the interior of the chamber to the metallic mold forms 30, setting up an electrostatic field between the metallic molds and the discharge electrodes 20 and 22. In other words, the metallic molds 30 themselves serve as the collecting electrodes. The drawings indicate that the metallic mold is in the form of glove, but it will be understood that any mold of desired shape may be employed and if the shape employed includes pointed protuberances, it will be understood that a shield will be carried by the molds to prevent excess agglomeration of fibers on the pointed protuberances.

As will be seen clearly from the drawings, the mold forms 30 are constructed of metal carrying interiorly thereof an insulated member 32, preferably in the form of a rubber block. The chamber 10 is provided with a bottom partition 34 which is inturned centrally thereof as at 36 to provide a longitudinally extending slit or opening 37. Retained in and depending from the insulated member 32 in each of the mold forms 30 is a shaft 38 to which is secured intermediate its length a pinion 40 that engages a rack bar 42 carried longitudinally of the sides of the container. Thus it will be seen that as the pinion 40 engages the rack 42 the shaft 38 and the associated mold form 30 will be caused to rotate.

Each of the mold forms 30 includes a bottom flange 44 to which is secured a conductive ring 46, such as carbon, which is rotatable with the mold form 30. A pair of longitudinally extending insulated tracks 48 are secured to the partition 34 and retained within proper recesses in the tracks 48 are metallic longitudinally extending rails 50 adapted to contact the carbon rings 46 and produce a proper electrical connection therewith. As will be seen clearly from Figure 6, the conductive wire 26 from the other terminal of the high-voltage source is directly connected to one of the longitudinal metallic rails 50 so that the mold form 30 can retain an electrical charge opposite to that of the discharge electrodes 20 and 22.

Rotatably positioned within suitable bearings beneath the partition 34 of the chamber is a vertically extending rotatable shaft 52 which is driven by any suitable motor (not shown). Fixed to the shaft 52 and rotatable therewith is a pair of spaced sprockets 54. It will be understood that other stub shafts and vertically spaced sprockets may be provided at suitable points throughout the chamber and below the partition 34, and over all of these sprockets including the sprockets 54 are entrained endless chains 56. A suitable bracket 58 is secured as at 60 to the chains 56 at various desired points, the upper portion of the bracket being provided with a bearing 60 for rotatably receiving the lower end of each of the shafts 38 depending from each of the mold forms 30. Thus it will be seen, particularly from Figure 7, that the mold forms 30 will be constantly charged oppositely to that of the charge on the discharge electrodes 20 and 22 and will be driven through the chamber between the discharge electrodes, the rack 42 and pinion 40 serving to rotate the mold forms as they pass through the chamber.

Secured to the sides of the chamber 10 in any appropriate manner and interiorly thereof are brackets 62 on both sides of the mold forms, the brackets carrying spray guns 64 which are inclined towards the mold forms for delivering a spray of fibers or adhesive within the path of movement of the mold forms. It is preferred that the spray guns 64 be positioned closer to the mold forms 30 than the discharge electrodes 20 and 22 so that the material being sprayed will more positively deposit upon the mold forms rather than be attracted to the discharge electrodes themselves.

The construction described hereinabove is of a chamber having an electrostatic field in which flock or fibers are to be sprayed upon the mold forms 30, followed by a spray of adhesive, followed by a spray of flock or fibers again. In the continuous process to be more fully described hereinafter, it will be understood that one chamber 10 may be employed for the sequential spraying of the flock and adhesive or, if preferred, three such chambers may be employed in series with each other, the conveyor for moving the mold forms extending in a continuous fashion through these three chambers, and for that matter through the heating and cooling chambers for the completion of the article.

The actual process steps employed are as follows:

1. Under a small positive air pressure, short fibers or flock are sprayed through the spray guns 64 onto the charged metallic molds 30. A suitable spray gun to be used for this purpose is shown and described in the Patent 2,357,392 and to insure a properly dispersed spray and to prevent agglomeration of the spray, a suitable screen may be positioned at the nozzle. As will be readily understood, the short fibers or flock 66 will adhere electrostatically to the mold forms 30 extending substantially perpendicularly therefrom as shown clearly in Figure 2.

2. Thereafter, a suitable adhesive or liquid plastic 68 will be sprayed, either mechanically or in a chamber having an electrostatic field, the adhesive coating the free ends of the fibers 66 as shown clearly in Figure 3. It will be understood that the spray gun 64 may have to be varied in construction somewhat to permit the proper emission of the adhesive or liquid plastic 68.

3. Following this, a further layer of flock 70 is sprayed under a small positive air pressure through the spray gun 64, either mechanically or in an electrostatic field, so that the further fibers will become partially embedded in and extend substantially perpendicularly to the adhesive layer 68 as shown clearly in Figure 4.

4. Depending upon the nature of the adhesive used, as will be described hereinafter, the mold forms 30 with the two layers of flock and adhesive therebetween on the mold forms will be conveyed through a heating chamber to render the adhesive layer somewhat more fluid so that the fibers 66 and 70 will be more securely embedded in the adhesive layer.

5. Thereafter the mold form is conveyed through a cooling chamber for solidifying the adhesive layer 68 and after this, the double-flocked article may be readily stripped from the mold forms as a finished article shown clearly in Figure 5.

With respect to the adhesive or liquid plastic employed, it becomes necessary to provide some means for preventing the adhesive from flowing between the fibers and reaching the metallic forms 30 themselves, in which condition the finished product will not resemble that desired as shown in Figure 5. To offset the possibility of the liquid adhesive from flowing to the mold forms, the nature and the viscosity of the adhesives will, of course, solve this problem. Best suited as adhesives for this purpose are the vinyl type resin suspensions, as described, for example, in the Patent 2,431,078. Also, a resin containing 87% vinyl chloride and 13% vinyl acetate by weight may be employed together with a thinner and plasticizer. For example, a liquid plastic containing by weight 20% of the vinyl chloride-acetate resin described immediately hereinabove together with 40% methyl isobutyl ketone, and 40% toluene may be employed. To this may be added a plasticizer, such as dioctyl phthalate in proportions running from 20 to 50% by weight of the resin and a thinner of 5 parts methyl ethyl ketone and 95 parts toluene.

In general, the vinyl type suspensions are particularly suited as adhesives in the present process, the vinyl organosols being an example of such vinyl suspensions.

Alternatively, it may be possible to first coat the metallic mold forms 30 with a layer of gelatine which will not seriously impair the charge on the metallic mold forms. Thereafter, the flock, adhesive, and flock are deposited upon the mold form as described hereinafter. Inasmuch as the gelatine is water soluble, it will be understood that the gelatine can be washed away from the inner layer 66 of flock so that the fibers can be exposed to produce a finished article as shown in Figure 5. The preferred method, of course, is to employ the vinyl resin suspensions mentioned hereinabove.

With regard to the temperatures to be employed in the heating chamber, the temperature will, of course, depend upon the type of adhesives sprayed or deposited upon the first layer 66 of flock. The temperature should be just a few degrees higher than that required to render the adhesive film viscous and fluid and, of course, materially below the temperatures at which the fibers, natural or synthetic, begin to decompose. With regard to the use of certain types of adhesives, it would be well to further mention that a copolymer of polyvinyl chloride and polyvinyl acetate in a powder form ground into small particles can also be employed with the particles dispersed in water to which has been added a small amount of solvent such as a ketone. Apparently, the copolymer particles absorb the solvent, swell, and become tacky as a result. The suspension which results is sprayed upon the first layer of flock 66 and most of the water runs off as the particles of adhesive are oriented on the ends of the flock. The remaining water may be evaporated in the heating chamber where the copolymer particles are solidified and cured, or partially cured.

Thus it will be understood that the heating chamber may be employed either to cure or dry the adhesive deposited upon the first layer of flock 66 or may be employed to render the adhesive somewhat more viscous and flowable so that better adhesion will be produced to retain both layers 66 and 70 of flock on the adhesive 68. In the latter case, it will be understood that a cooling chamber will have to be provided as a positive feature of the invention whereas in the former case, simple air cooling might suffice.

While the overall length of the flocks or fibers may be varied as desired, it is preferred that the lengths range from 1/8 to 1/64 of an inch. Also, while the thickness of the intermediate adhesive layer 68 may also be varied as desired, a substantial product is obtained when the layer is built up to a thickness varying between three and fifteen mils.

Thus it will be seen that an extremely useful and efficient process of continuously producing a novel double-flocked article is provided. This process will allow the manufacturer to produce light weight, pliable, double-flocked articles of any desired shapes and dimensions having no sewn seams and no conventional backing to support and orient the fibers.

Although a preferred embodiment of the invention has been shown and described hereinabove, it will be understood that minor variations in the process and article may be made by those skilled in the art without departing from the spirit of the invention and the scope of the appended claims.

Having described the invention, what is claimed as new is:

1. A process of producing an article having inner and outer layers of flock separated solely by an adhesive comprising first spraying flock on a charged mold form through an electrostatic field said mold form being charged differently from said field, then depositing droplets which form a layer of adhesive on the free ends of the flock, and thereafter spraying further flock on the adhesive.

2. The process of claim 1, and the steps of passing the article through a heating zone to increase the fluidity and binding power of the adhesive followed by passing the article through a cooling zone to solidify the adhesive.

3. The process of claim 1, wherein the adhesive is sprayed on the first layer of flock through the electrostatic field.

4. The process of claim 1, wherein the further flock is sprayed onto the adhesive through the electrostatic field.

5. The process of claim 4, wherein the adhesive is sprayed on the first layer of flock through the electrostatic field.

6. The process of claim 5, and the steps of passing the article through a heating zone to increase the fluidity and binding power of the adhesive followed by passing the article through a cooling zone to solidify the adhesive.

7. A process of producing articles having inner and outer layers of flock separated solely by an adhesive comprising passing a series of charged mold forms through an electrostatic field said mold forms being charged differently from said field, spraying flock on the mold forms in the field and in the path of movement of the molds, depositing droplets of an adhesive forming a layer on the free ends of the flock, and spraying further flock on the adhesive.

8. The process of claim 7, wherein the mold forms are rotated as they pass through the field and the flock is sprayed on all surfaces of the mold forms.

9. The process of claim 8, and the steps of passing the article through a heating zone to increase the fluidity and binding power of the adhesive followed by passing the article through a cooling zone to solidify the adhesive.

WALTER R. SAKS.

REFERENCES CITED

The following references are of record in the file of this patent:

UNITED STATES PATENTS

| Number    | Name       | Date          |
|-----------|------------|---------------|
| 925,263   | Ayrault    | June 15, 1909 |
| 1,989,885 | Richter    | Feb. 5, 1935  |
| 2,222,539 | Meston     | Nov. 19, 1940 |
| 2,444,532 | Richardson | July 6, 1948  |
| 2,444,533 | Richardson | July 6, 1948  |